US008457626B2

(12) United States Patent
Roumeliotis et al.

(10) Patent No.: US 8,457,626 B2
(45) Date of Patent: *Jun. 4, 2013

(54) SYSTEM AND METHOD FOR AGGREGATING AND DISSEMINATING MOBILE DEVICE TAG DATA

(75) Inventors: Tasos Roumeliotis, Orinda, CA (US); Scott Hotes, Berkeley, CA (US); Daniel Hodges, San Francisco, CA (US); Joel Grossman, San Francisco, CA (US)

(73) Assignee: WaveMarket, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,690

(22) Filed: Aug. 13, 2012

(65) Prior Publication Data

US 2012/0316964 A1    Dec. 13, 2012

Related U.S. Application Data

(63) Continuation of application No. 12/858,170, filed on Aug. 17, 2010, now Pat. No. 8,244,236.

(60) Provisional application No. 61/329,509, filed on Apr. 29, 2010.

(51) Int. Cl.
*H04W 64/00* (2009.01)

(52) U.S. Cl.
USPC ...................................... 455/424; 455/456.5

(58) Field of Classification Search
USPC ................. 455/414.1, 406, 456.1, 41.2, 517, 455/424, 456.5; 340/572.1, 572.8, 8.1, 539.1; 707/999.003
See application file for complete search history.

(56) References Cited

U.S. PATENT DOCUMENTS

| 5,045,861 | A | | 9/1991 | Duffett-Smith et al. |
| 5,524,136 | A | | 6/1996 | Barnoy et al. |
| 5,564,079 | A | | 10/1996 | Olsson |
| 5,664,231 | A | * | 9/1997 | Postman et al. ................ 710/73 |
| 5,666,651 | A | | 9/1997 | Wang |

(Continued)

FOREIGN PATENT DOCUMENTS

AU    200066612 B2    10/2000
DE    29919376 U1    2/2000

(Continued)

OTHER PUBLICATIONS

M. Hata, "Empirical formula for propagation loss in land mobile radio services" IEEE Transactions on Vehicular Technology, vol. VT-29, pp. 317-325, Aug. 1980.

(Continued)

*Primary Examiner* — Mahendra Patel
(74) *Attorney, Agent, or Firm* — Dovas Law, P.C.

(57) ABSTRACT

A computer-implemented method for aggregating and disseminating tag data is provided. The method includes receiving a tag generated at a particular time from a particular mobile device. Data indicative of a particular location of the particular mobile device is received corresponding to the particular time. The tag is associated with the location indicative data of the particular mobile device. Data indicative of a location of one or more other mobile devices is received, and data indicative of the tag is transmitted to the one or more other mobile devices in response to the location indicative data of the one or more other mobile devices corresponding to the location indicative data of the particular mobile device.

16 Claims, 5 Drawing Sheets

U.S. PATENT DOCUMENTS

| | | |
|---|---|---|
| 5,905,953 A | 5/1999 | Liu et al. |
| 5,950,125 A | 9/1999 | Buhrmann et al. |
| 5,969,679 A | 10/1999 | Bolliger |
| 5,999,126 A | 12/1999 | Ito |
| 6,041,236 A | 3/2000 | Bernardin et al. |
| 6,052,064 A | 4/2000 | Budnik et al. |
| 6,061,021 A | 5/2000 | Zibell |
| 6,073,089 A | 6/2000 | Baker et al. |
| 6,088,598 A | 7/2000 | Marsolais |
| 6,097,939 A | 8/2000 | Jacobs |
| 6,104,344 A | 8/2000 | Wax et al. |
| 6,167,265 A | 12/2000 | Kim et al. |
| 6,185,422 B1 | 2/2001 | Mattila |
| 6,201,499 B1 | 3/2001 | Hawkes et al. |
| 6,205,326 B1 | 3/2001 | Tell et al. |
| 6,263,208 B1 | 7/2001 | Chang et al. |
| 6,266,534 B1 | 7/2001 | Raith et al. |
| 6,269,246 B1 | 7/2001 | Rao et al. |
| 6,330,600 B1 | 12/2001 | Matchefts et al. |
| 6,356,763 B1 | 3/2002 | Kangas et al. |
| 6,360,094 B1 | 3/2002 | Satarasinghe |
| 6,393,294 B1 | 5/2002 | Perez-Breva et al. |
| 6,411,819 B1 | 6/2002 | Gutowski |
| 6,449,257 B1 | 9/2002 | Choi |
| 6,449,486 B1 | 9/2002 | Rao |
| 6,496,701 B1 | 12/2002 | Chen et al. |
| 6,529,165 B1 | 3/2003 | Duffett-Smith et al. |
| 6,556,842 B1 | 4/2003 | Ericsson |
| 6,560,442 B1 | 5/2003 | Yost et al. |
| 6,567,381 B1 | 5/2003 | Jeon et al. |
| 6,591,116 B1 | 7/2003 | Laurila et al. |
| 6,631,262 B1 | 10/2003 | Wee |
| 6,711,404 B1 | 3/2004 | Arpee et al. |
| 6,728,539 B2 | 4/2004 | Kuwahara |
| 6,748,224 B1 | 6/2004 | Chen et al. |
| 6,782,265 B2 | 8/2004 | Perez-Breva et al. |
| 6,799,046 B1 | 9/2004 | Tang |
| 6,834,180 B1 | 12/2004 | Marshall |
| 6,856,805 B1 | 2/2005 | Raaf |
| 6,859,654 B1 | 2/2005 | Reynolds et al. |
| 6,947,734 B1 | 9/2005 | Toubassi |
| 6,947,835 B2 | 9/2005 | Kaplan et al. |
| 6,950,664 B2 | 9/2005 | Chen et al. |
| 6,961,587 B1 | 11/2005 | Vilppula et al. |
| 7,031,722 B2 | 4/2006 | Naghian |
| 7,079,850 B2 | 7/2006 | Cameron |
| 7,096,115 B1 | 8/2006 | Groth et al. |
| 7,158,790 B1 | 1/2007 | Elliott |
| 7,158,798 B2 | 1/2007 | Lee et al. |
| 7,233,800 B2 | 6/2007 | Laroia et al. |
| 7,289,763 B2 | 10/2007 | Dennison et al. |
| 7,505,433 B2 | 3/2009 | Yaqub et al. |
| 7,668,832 B2 | 2/2010 | Yeh et al. |
| 7,697,920 B1 | 4/2010 | McClain |
| 7,751,827 B2 | 7/2010 | Poykko et al. |
| 7,802,724 B1 * | 9/2010 | Nohr ............................ 235/384 |
| 8,244,236 B2 | 8/2012 | Roumeliotis et al. |
| 2001/0022558 A1 | 9/2001 | Karr et al. |
| 2002/0042268 A1 | 4/2002 | Cotanis |
| 2002/0042269 A1 | 4/2002 | Cotanis |
| 2002/0101834 A1 | 8/2002 | Stanley |
| 2002/0111772 A1 | 8/2002 | Skidmore et al. |
| 2002/0128019 A1 | 9/2002 | Ben-Yair et al. |
| 2002/0164997 A1 | 11/2002 | Parry |
| 2002/0168989 A1 | 11/2002 | Dooley et al. |
| 2002/0173275 A1 | 11/2002 | Coutant |
| 2002/0193150 A1 | 12/2002 | Pritchard |
| 2003/0008668 A1 | 1/2003 | Perez-Breva et al. |
| 2003/0032404 A1 | 2/2003 | Wager et al. |
| 2003/0040318 A1 | 2/2003 | Fattouche |
| 2003/0043941 A1 | 3/2003 | Johnson et al. |
| 2003/0060214 A1 | 3/2003 | Hendrey et al. |
| 2003/0078042 A1 | 4/2003 | Miriyala et al. |
| 2003/0078055 A1 | 4/2003 | Smith et al. |
| 2003/0109274 A1 | 6/2003 | Budka et al. |
| 2003/0119501 A1 | 6/2003 | Kim |
| 2003/0125031 A1 | 7/2003 | Sung Lim et al. |
| 2003/0147362 A1 | 8/2003 | Dick et al. |
| 2003/0148771 A1 | 8/2003 | deVerteuil |
| 2003/0186710 A1 | 10/2003 | Muhonen et al. |
| 2003/0190916 A1 | 10/2003 | Celedon et al. |
| 2003/0208589 A1 | 11/2003 | Yamamoto |
| 2004/0002344 A1 | 1/2004 | Moeglein et al. |
| 2004/0018835 A1 | 1/2004 | Myers et al. |
| 2004/0037258 A1 | 2/2004 | Scherzer et al. |
| 2004/0116111 A1 | 6/2004 | Saunders |
| 2004/0132464 A1 | 7/2004 | Poykko et al. |
| 2004/0152470 A1 | 8/2004 | Spain |
| 2004/0157621 A1 | 8/2004 | Yamasaki et al. |
| 2004/0160365 A1 | 8/2004 | Riley et al. |
| 2004/0185822 A1 | 9/2004 | Tealdi et al. |
| 2004/0199398 A1 | 10/2004 | Kubota |
| 2004/0203717 A1 | 10/2004 | Wingrowicz |
| 2004/0203880 A1 | 10/2004 | Riley |
| 2004/0203885 A1 | 10/2004 | Quaid |
| 2004/0225681 A1 | 11/2004 | Chaney et al. |
| 2004/0248589 A1 | 12/2004 | Gwon et al. |
| 2005/0012613 A1 * | 1/2005 | Eckstein et al. ......... 340/539.13 |
| 2005/0040968 A1 | 2/2005 | Damarla et al. |
| 2005/0044564 A1 | 2/2005 | Stopniewicz et al. |
| 2005/0066325 A1 | 3/2005 | Mori et al. |
| 2005/0096042 A1 * | 5/2005 | Habeman et al. .......... 455/422.1 |
| 2005/0113117 A1 | 5/2005 | Bolin et al. |
| 2005/0134696 A1 | 6/2005 | Nath et al. |
| 2005/0136938 A1 | 6/2005 | Kang |
| 2005/0169183 A1 | 8/2005 | Lakkakorpi |
| 2005/0192031 A1 | 9/2005 | Vare |
| 2005/0202821 A1 | 9/2005 | Pischella |
| 2005/0210342 A1 | 9/2005 | Schwagmann |
| 2005/0227683 A1 | 10/2005 | Draluk et al. |
| 2005/0239478 A1 | 10/2005 | Spirito |
| 2005/0282540 A1 | 12/2005 | Motamedi et al. |
| 2005/0282544 A1 | 12/2005 | Oommen et al. |
| 2005/0283540 A1 | 12/2005 | Fux et al. |
| 2006/0019665 A1 | 1/2006 | Aghvami et al. |
| 2006/0019679 A1 | 1/2006 | Rappaport et al. |
| 2006/0025068 A1 | 2/2006 | Regan et al. |
| 2006/0025158 A1 | 2/2006 | Leblanc et al. |
| 2006/0052057 A1 | 3/2006 | Persson et al. |
| 2006/0064346 A1 | 3/2006 | Steenstra et al. |
| 2006/0087425 A1 | 4/2006 | Haeberlen et al. |
| 2006/0205417 A1 | 9/2006 | Ju et al. |
| 2006/0221901 A1 | 10/2006 | Yaqub et al. |
| 2006/0227045 A1 | 10/2006 | Sheynblat |
| 2006/0234701 A1 | 10/2006 | Wang et al. |
| 2006/0270421 A1 | 11/2006 | Phillips et al. |
| 2007/0001808 A1 * | 1/2007 | Kastelic et al. ............... 340/10.1 |
| 2007/0001867 A1 | 1/2007 | Rowe et al. |
| 2007/0087425 A1 | 4/2007 | Haeberlen |
| 2007/0087764 A1 | 4/2007 | Buckley et al. |
| 2007/0121520 A1 | 5/2007 | Shrikhande et al. |
| 2007/0123268 A1 | 5/2007 | Parata |
| 2007/0208495 A1 | 9/2007 | Chapman et al. |
| 2007/0232319 A1 | 10/2007 | Bells et al. |
| 2007/0259670 A1 | 11/2007 | Sakhpara |
| 2007/0270168 A1 | 11/2007 | Sheynblat |
| 2007/0281689 A1 | 12/2007 | Altman et al. |
| 2007/0297346 A1 | 12/2007 | Huismann et al. |
| 2008/0004037 A1 | 1/2008 | Achlioptas et al. |
| 2008/0030345 A1 * | 2/2008 | Austin et al. ............... 340/572.8 |
| 2008/0061967 A1 | 3/2008 | Corrado |
| 2008/0071749 A1 * | 3/2008 | Schloter ........................ 707/3 |
| 2008/0146250 A1 | 6/2008 | Aaron |
| 2009/0160939 A1 | 6/2009 | Fernandez et al. |
| 2009/0182630 A1 | 7/2009 | Otto et al. |
| 2009/0294538 A1 * | 12/2009 | Wihlborg et al. ............ 235/454 |
| 2010/0167725 A1 | 7/2010 | Noldus et al. |
| 2011/0098029 A1 * | 4/2011 | Rhoads et al. ............... 455/418 |
| 2011/0098056 A1 | 4/2011 | Rhoads et al. |
| 2011/0244919 A1 | 10/2011 | Aller et al. |
| 2012/0253668 A1 | 10/2012 | Sheha et al. |

FOREIGN PATENT DOCUMENTS

| | | |
|---|---|---|
| EP | 0431956 A2 | 7/1990 |
| EP | 0874248 A2 | 10/1998 |
| EP | 0936758 A2 | 8/1999 |
| EP | 0982964 A2 | 3/2000 |

| | | |
|---|---|---|
| EP | 1030531 A1 | 8/2000 |
| EP | 1120632 B1 | 8/2001 |
| EP | 1175115 A2 | 1/2002 |
| EP | 1235076 A1 | 8/2002 |
| EP | 1271101 A2 | 1/2003 |
| EP | 1304897 A1 | 4/2003 |
| EP | 0767594 B1 | 11/2003 |
| EP | 1677562 A1 | 7/2006 |
| EP | 1137305 B1 | 1/2008 |
| EP | 2083576 A1 | 7/2009 |
| GB | 2352134 A | 1/2001 |
| GB | 2358500 A | 7/2001 |
| GB | 2364617 A | 1/2002 |
| JP | 07-255079 A | 10/1995 |
| JP | 08-265824 A | 10/1996 |
| JP | 2001-330657 A | 11/2001 |
| JP | 2004-104349 A | 4/2004 |
| WO | WO 92/02105 A1 | 2/1992 |
| WO | WO 93/15569 | 8/1993 |
| WO | WO 95/35636 A1 | 12/1995 |
| WO | WO 97/11384 A | 3/1997 |
| WO | WO 98/12885 A2 | 3/1998 |
| WO | WO 98/48578 A2 | 10/1998 |
| WO | WO 9843450 | 10/1998 |
| WO | WO 99/13662 A | 3/1999 |
| WO | WO 00/18148 A | 3/2000 |
| WO | WO 00/28755 A1 | 5/2000 |
| WO | WO 0049826 | 8/2000 |
| WO | WO 01/03372 A | 1/2001 |
| WO | WO 01/37601 | 5/2001 |
| WO | WO 01/99082 A2 | 12/2001 |
| WO | WO 02/047421 | 12/2001 |
| WO | WO 0195592 | 12/2001 |
| WO | WO 02/073997 A1 | 9/2002 |
| WO | WO 02/082850 | 10/2002 |
| WO | WO 03/087869 | 10/2003 |
| WO | WO 2004034721 | 4/2004 |
| WO | WO 2004/047315 A2 | 6/2004 |
| WO | WO 2004/079478 A2 | 9/2004 |
| WO | WO 2004/080105 A2 | 9/2004 |
| WO | WO 2004/084022 A2 | 9/2004 |
| WO | WO 2005/009020 A1 | 1/2005 |
| WO | WO 2005/109695 A1 | 11/2005 |
| WO | WO 2006/026816 A2 | 3/2006 |
| WO | WO 2006/053835 A1 | 5/2006 |
| WO | WO 2006/059188 A1 | 6/2006 |
| WO | WO 2006087438 A1 | 8/2006 |
| WO | WO 2006/096922 A1 | 9/2006 |
| WO | WO 2006/096923 A1 | 9/2006 |
| WO | WO 2006/105618 A1 | 10/2006 |
| WO | WO 2006/105619 A1 | 10/2006 |
| WO | WO 2006/112561 | 10/2006 |
| WO | WO 2006/125085 | 11/2006 |
| WO | WO 2007/017691 A1 | 2/2007 |
| WO | WO 2007/020635 A2 | 2/2007 |
| WO | WO 2007/040320 A1 | 4/2007 |
| WO | WO 2007040320 | 4/2007 |
| WO | WO 2007/048176 | 5/2007 |
| WO | WO 2007/048177 | 5/2007 |
| WO | WO 2007/051223 A1 | 5/2007 |
| WO | WO 2007/071271 A1 | 6/2007 |
| WO | WO 2007/102816 A1 | 9/2007 |
| WO | WO 2007/115777 A1 | 10/2007 |
| WO | WO 2008/055302 | 5/2008 |
| WO | WO 2008/059570 | 5/2008 |
| WO | WO 2008/109948 A1 | 9/2008 |
| WO | WO 2009/036497 | 3/2009 |
| WO | WO 2009/067766 | 6/2009 |
| WO | WO 2009080105 | 7/2009 |
| WO | WO 2009/124348 | 10/2009 |
| WO | WO 2009/124349 | 10/2009 |
| WO | WO 2010/022470 | 3/2010 |
| WO | WO 2010090558 | 8/2010 |

OTHER PUBLICATIONS

T. Roos, P. Myllymaki, and H. Tirri, "A statistical modeling approach to location estimation," IEEE Transactions on Mobile Computing vol. 1, pp. 59-69, Jan. 2002.

T. Halonen J. Romero and J. Melero, GSM, GPRS and EDGE Performance; Evolution Towards SG/UMTS. John Wiley and Sons, 2nd ed., 2003.

L.M. Correia, Wireless Flexible Personalized Communications: Cost 259 European Co-Operation in Mobile Radio Research. Wiley 2001.

IEEE Vehicular Technology Society Committee on Radio Propagation Coverage Prediction for Mobile Radio Systems Operating in the 800/900 MHz frequency range IEEE Transactions on Vehicular Technology: Special Issue on Mobile Radio Propagation, vol. 37, pp. 3-72, Feb. 1988.

3rd Generation Partnership Program, "3GPP TR 25.942 Radio Frequency (RF) System Scenarios," tech. rep., 3GPP, 2004.

Schwartz et al., "On the Distribution and Moments of Power Sums with Logonormal Components", Bell Sys. Tech, J., vol. 61, No. 7, pp. 1441-1463.

Balis P. G. et al. "UTD-Based Model for Prediction of Propagation Path Loss and Shadowing Variability in Urban Mobile Environments" IEE Proceedings: Microwaves, Antennas and Propagation, IEE, Stevenage, Herts, GB, vol. 144 No. 5 Oct. 9, 1997, pp. 367-371 XP006008788 ISSN: 1350-2417.

W.C.Y. Lee, Mobile Communications Engineering. McGraw-Hill, 1982.

Bernardin et al., "Cell Radius Inaccuracy: A New Measure of Coverage Reliability", IEEE Transactions on Vehicular Technology, vol. 47, No. 4, Nov. 1998.

W.H. Press S. A. Teukolsky, W.T. Vetterling & B.P. Flannery, "Numerical Recipes in C++; The Art of Scientific Computing", 2nd Ed, Feb. 2002, Cambridge University Press.

C.R. Drane, Positioning Systems—A Unified Approach, Lecture Notes in Control and Infromation Sciences, Springer Verlag, Oct. 1992.

P.L.H.A.S. Fischer, "Evaluation of Positioning Measurement Systems," T1P1.5/97-110, Dec. 1997.

A.M. Zoubir and B. Boobash, "The Bootstrap and Its Application in Signal Processing," IEEE Signal Processing Magazine, 15(1):56-76, Jan. 1998.

Martin Hellenbrandt, Rudolf Mathar and Scheibenbogen Markus, "Estimating Position and Velocity of Mobiles in a Cellular Radio Network," IEEE Transactions on Vehicular Technology, 46(1): 65-71, Feb. 1997.

Section 2.7 of Mobile Radio Communications 2nd Ed. Steele and Hanzo, IBSN 047197806X,J. Wiley & Sons Ltd., 1999.

B. Matsumori T1P1.5/98-600 "Radio Camera System and Location Fingerprinting Technology", Presentation Submission to Location Standards Working Group T1P1.5 by U.S. Wireless 1998.

Annex I of GSM 05.05 "Digital cellular Telecommunication System (Phase 2)", Radio Transmission and Reception, 2001.

S.R. Saunders & A. Aragon-Zavala, Antennas and Propagation for Wireless Communications Systems: 2nd Ed., Wiley 2007.

Doru-Petru Munteanu, Onoriu Bradeanu, Petrica Ciotirnae, Constantin-Julian Vizitiu: "Zone Profile Generation for Location Based Services and Traffic Analysis", 12th WSEAS International Conference on Communications, Heraklion, Greece, Jul. 23-25, 2008, pp. 386-390.

Specification 3GPP TS 31.111—Sections 6.4, 6.616, 6.6.21 and 6.6. 22.

"Computational Geometry in C (Cambridge Tracts in Theoretical Computer Science)", Joseph O'Rourke, Cambridge University Press; 2000 edition, ISBN 0521649765.

European Search Report dated Nov. 4, 2010 for EP 08714391.3.

International Search Report dated Sep. 20, 2004 for PCT/AU2004/000983.

European Search Report dated Mar. 15, 2007 for EP 04737602.5.

International Search Report dated Dec. 5, 2005 for PCT/AU2005/001358.

International Search Report dated May 7, 2008 for PCT/AU2008/000344.

International Search Report dated Apr. 26, 2006 for PCT/AU2006/000347.

International Search Report dated Apr. 26, 2006 for PCT/AU2006/000348.

European Search Report dated Feb. 19, 2010 for EP 06721361.1.

International Search Report dated May 31, 2006 for PCT/AU2006/000479.
International Search Report dated Jun. 29, 2006 for PCT/AU2006/000478.
European Search Report dated Dec. 22, 2009 for EP 06721360.3.
European Search Report dated Jul. 23, 2010 for EP 06705018.7.
International Search Report dated Jan. 24, 2007 for PCT/AU2006/001479.
International Search Report dated Dec. 19, 2006 for PCT/AU2006/001576.
International Search Report dated Feb. 19, 2008 for PCT/AU2007/001706.
International Search Report dated Nov. 24, 2008 for PCT/AU2008/001374.
International Search Report dated Jan. 15, 2009 for PCT/AU2008/001783.
International Search Report dated Jun. 1, 2009 for PCT/AU2009/000436.
International Search Report dated Nov. 25, 2009 for PCT/AU2009/001123.
International Search Report dated May 11, 2009 for PCT/AU2009/000438.
European Search Report dated Feb. 19, 2009 for EP 06705017.9.
3GPP SA WG2, "Voice Call Continuity between CS and IMS Study" 3GPP TR 23.806 V7 0.0, Dec. 1, 2005, pp. 1-153, XP002385067.
OMA Download Architecture—Version 1.0, Jun. 25, 2004.
Mir et. al, "A Zone-Based Location Service for Mobile Ad Hoc Networks", 1NCC 2004, Jun. 2004.
3GPP TR05.08, "Radio Subsystem Link Control", Nov. 2005.
Specification 3GPP TS 23.048, "Technical Specification Group Core Network and Terminals; Security Mechanisms for the (U)SIM Application Toolkit", 2005-2006.
Specification 3GPP TS 25.304 "User Equipment (UE) Procedures in Idle Mode and Procedures for Cell Reselection in Connected Mode", 2011.
Specification 3GPP TS 03.22, "Radio Access Network; Functions Related to Mobile Station(MS) in Idle Mode and Group Receive Mode", 1999.
International Search Report of PCT/AU2006/001577 dated Nov. 28, 2006.
International Search Report dated Nov. 3, 2011 for PCTAU2011/001038.
European Search Report dated Mar. 2, 2012 for European Patent Application 09729670.1.
European Search Report dated Feb. 24, 2012 for European Patent Application 09729862.4.
European Search Report dated Feb. 22, 2012 for European Patent Application 08714391.3.
European Search Report dated Mar. 12, 2012 for European Patent Application 06790414.4.
European Search Report dated Mar. 9, 2012 for European Patent Application 08800009.6.
European Search Report dated Mar. 12, 2012 for European Patent Application 06804431.2.
European Search report dated Jul. 25, 2012 for European Patent Application 06790349.2.

* cited by examiner

SYSTEM AND METHOD FOR AGGREGATING AND DISSEMINATING MOBILE DEVICE TAG DATA

CROSS REFERENCE TO RELATED APPLICATION(S)

This application is a continuation of U.S. application Ser. No. 12/858,170, filed Aug. 17, 2010, which claims the benefit of U.S. provisional application 61/329,509, filed Apr. 29, 2010, which applications are incorporated by reference as if fully set forth.

BACKGROUND

Many modern mobile devices, such as mobile smartphones, now have the ability to perform network scans to determine radio signal information, such as identifiers associated with nearby cellular base transceiver stations, WiFi™ access points and Bluetooth™ access points. Mobile devices may be further enabled to perform signal strength estimates and other signal measurements. Base transceiver stations and radio access points are primarily used for voice and data service access to the mobile device, but due to their relative permanence can be exploited for other purposes, including determining device location.

A number of approaches exist to translate signal information into location, including cell triangulation and trilateration techniques, such as Time Difference of Arrival ("TDOA"), Enhanced Observed Time Difference ("EOTD"), Advanced Forward Link Trilateration ("AFLT") and Enhanced Cell Identification ("E-CID"). Such methods are considered terrestrial counterparts to the GPS satellite-based system which uses a form of triangulation based on satellite positioning.

In many environments it is difficult, if not impossible to directly use triangulation-type approaches against radio signals to determine a mobile device position. Particularly difficult environments typically include indoor environments, such as within office buildings or shopping malls, urban environments with high buildings, and rural environments with irregular terrain. In these environments, signal fade and signal multipath problems can make straightforward employment of signal triangulation unfeasible for determining mobile device location.

It may not be necessary for a particular location-based service application to have an exact ground truth location of a mobile device to provide specific content or services to a mobile device user. A particular location-based application may potentially function effectively given proper clues to a device's particular location even at times when a true location is not available for a particular mobile device. It would be desirable to provide a system and method by which mobile device users could receive location-based content without generating or providing an exact location with their mobile devices.

SUMMARY

The present invention provides a computer-implemented method for aggregating and disseminating tag data. The method includes receiving a tag generated at a particular time from a particular mobile device. Data indicative of a particular location of the particular mobile device is received corresponding to the particular time. The tag is associated with the location indicative data of the particular mobile device. Data indicative of a location of one or more other mobile devices is received, and data indicative of the tag is transmitted to the one or more other mobile devices in response to the location indicative data of the one or more other mobile devices corresponding to the location indicative data of the particular mobile device.

The present invention further provides another computer-implemented method for aggregating and disseminating tag data. The method includes receiving signals indicative of a location of a particular mobile device associated with a particular user. A tag is received via the particular mobile device. Signal fingerprints are generated associated with the location indicative signals. A particular signal fingerprint corresponding to a time the tag was received is associated with the tag. The associated tag and the signal fingerprints including the particular signal fingerprint are transmitted to a remote system via a network. Data indicative of a tag provided by at least one other mobile device associated with at least one other user corresponding to a current signal fingerprint of the particular mobile device is received with the particular mobile device from the remote system.

The present invention further provides non-transitory computer-readable media tangibly embodying a program of instructions executable by a processor of a particular mobile device associated with a particular user to implement a method. The method includes receiving signals indicative of a location of the particular mobile device associated with the particular user. A tag is received via the particular mobile device. Signal fingerprints are generated associated with the location indicative signals. A particular signal fingerprint corresponding to a time the tag was received is associated with the tag. The associated tag and the signal fingerprints including the particular signal fingerprint are transmitted to a remote system via a network. Data indicative of a tag provided by at least one other mobile device associated with at least one other user corresponding to a current signal fingerprint of the particular mobile device is received with the particular mobile device from the remote system. As stated herein non-transitory computer-readable media comprises all computer-readable media except for a transitory, propagating signal.

BRIEF DESCRIPTION OF THE DRAWING(S)

The foregoing Summary as well as the following detailed description will be readily understood in conjunction with the appended drawings which illustrate preferred embodiments of the invention. In the drawings.

DETAILED DESCRIPTION OF THE PREFERRED EMBODIMENT(S)

The preferred embodiments of the present invention are described below with reference to the drawing figures where like numerals represent like elements throughout.

Figure 1:
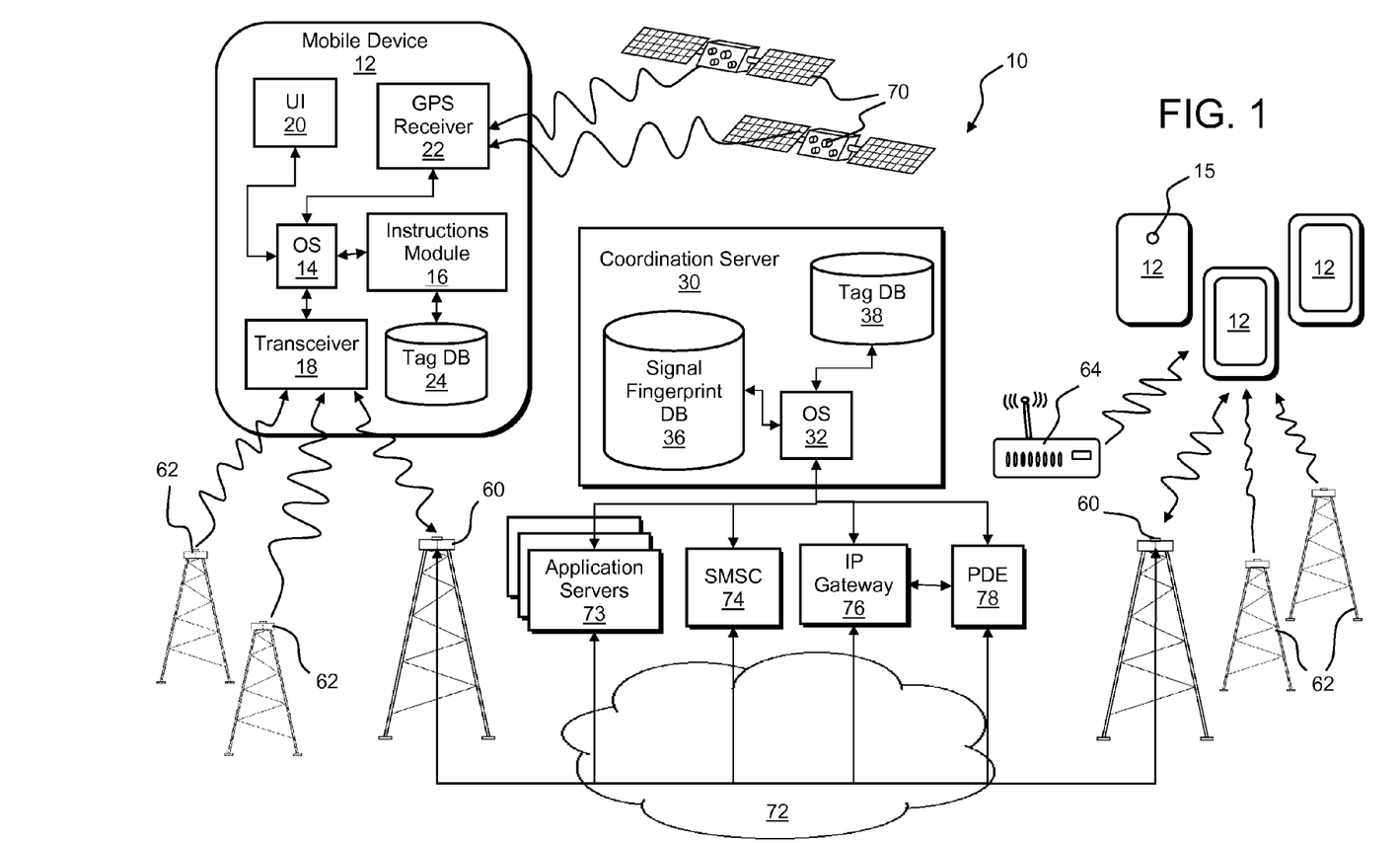
FIG. 1 is a schematic illustration of an exemplary operating environment in which mobile device communication systems are operable according to a preferred embodiment of the invention.

Referring to FIG. 1, a schematic illustration is shown of an exemplary operating environment 10 in which preferred mobile device communication systems, in the form of mobile devices 12 and a coordination server 30, can be used. The mobile devices 12 and coordination server 30 each include one or more computing devices and one or more memory devices, which computing devices and memory devices can be integrally constructed or connected in any suitable manner, for example integrally or via a network. It is to be understood that a server typically comprises a computer system, as known in the art.

Each mobile device 12 provides a platform according to a preferred embodiment of the invention which enables an operating system 14 and a module of instructions 16 preferably residing in a memory of the mobile device 12. The mobile device 12, which preferably includes cellular telephone functionality, includes a transceiver 18 for communication with cellular base transceiver stations 60, 62 ("base stations") and a user interface 20, preferably including a display and one or more audio speakers. A GPS receiver 22 is preferably provided for receiving signals from GPS satellites 70. The transceiver 18 can be further configured to communicate with other wireless stations or devices, or alternatively, the mobile device 12 can support a plurality of transceivers for communication with a plurality of wireless stations or devices.

The coordination server 30 provides a platform according to a preferred embodiment of the invention which enables an operating system 32 and memory or memories which permit operation of databases 36, 38. Preferably, mobile device signal fingerprint data is stored in a fingerprint database 36 and tag data corresponding to mobile device signal fingerprint data is stored in a tag database 38. The coordination server 30 is preferably configured to receive signal fingerprint data or other data indicative of mobile device location from the mobile devices 12 via a cellular telecommunication network 72. The signal fingerprint data or other location indicative data is preferably received by the coordination server 30 in the form of one or more short message service ("SMS") messages received from the mobile devices 12 via a short message service center ("SMSC") 74, which may be integrated with the telecommunication network 72. Alternatively, signal fingerprint data can be sent by the mobile devices 12, 112 using internet protocol ("TCP/IP") and received by the coordination server 30 via an internet protocol ("IP") gateway 76, which may be integrated with the telecommunication network 72. The coordination server 30 can alternatively query a remote position determining entity ("PDE") 78, a Gateway Mobile Location Center ("GMLC"), or other system for disseminating signal fingerprint data of mobile devices, which PDE 78, GMLC or other system may be provided as a service by a telecommunication carrier or other party, and which systems may deliver data to the coordination server 30 via internet protocol through the IP gateway 76 or via other suitable protocol. One or more external application servers 73 execute applications which use signal fingerprint and tag data provided by the mobile devices 12 or the coordination server 30 to provide content or services to a user of a particular mobile device.

Figure 2:
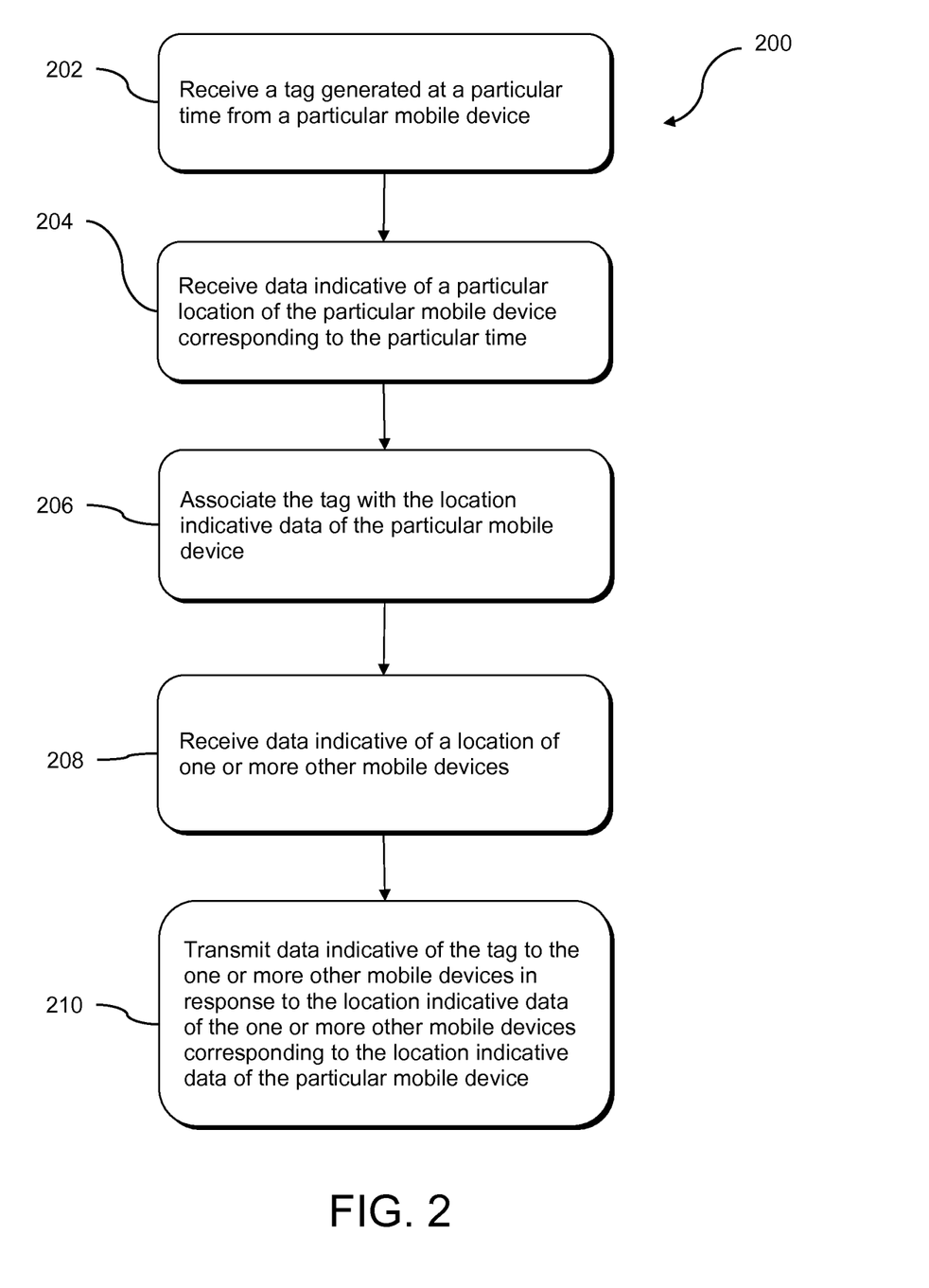
FIG. 2 is a flow chart showing a computer-implemented method for aggregating and disseminating tag data according to a preferred embodiment of the invention.

Referring to FIG. 2, a method 200 for aggregating and disseminating tag data is shown. The method 200 is described with reference to the preferred components shown in the operating environment 10 of FIG. 1, which components preferably include memory suitable for storing instructions for performance of the method 200. The method 200 may alternatively be performed via other suitable systems. The method 200 includes receiving a tag generated at a particular time from a particular mobile device 12 (step 202). The tag preferably includes a description of a product, an object, a location, a building, a point of interest, or other description associated with a physical entity at a particular location where the mobile device 12 is positioned. Further, data is received indicative of a particular location of the particular mobile device 12 corresponding to the particular time when the tag was generated (step 204), and the tag is associated with the location indicative data of the particular mobile device 12 (step 206). Data is received indicative of a location of one or more other mobile devices 12 (step 208), and data indicative of the tag is transmitted to the one or more other mobile devices 12 in response to the location indicative data of the one or more other mobile devices 12 corresponding to the location indicative data of the particular mobile device 12 (step 210). The steps of the method 200 are preferably performed by the coordination server 30 or other suitable system or systems via the network 72. Steps 202 through 206 correspond to a training process in which the coordination server 30 can build databases 36, 38 of tags paired with respective location indicative data. Steps 208 and 210 correspond to a positioning process in which the coordination server 30 matches its previously received location indicative data with current location indicative data of a mobile device 12 to provide the mobile device 12 with corresponding previously received tag data.

The data indicative of the location of the mobile device 12 preferably includes measurements of base station signal quality in the form of a signal fingerprint, which measurements are preferably performed by the mobile device 12 via the transceiver 18 during a radio signal scan. The location indicative data in the form of a signal fingerprint can further include measurements of signals from one or more other sources of any suitable protocol, such as from a local area network ("LAN") wireless access point 64, which signals can be discovered via the radio signal scan. The signal fingerprint is not necessarily associated with an actual physical location, which may be difficult to determine in certain environments due to interference causing irregular signal paths, and which calculation may potentially place greater computational and bandwidth burdens on device and network resources. The signal fingerprint can be computed in the manner of computation of estimated location or can alternatively include a recordation of measurements typically used for computation of estimated location. Estimated current location or signal fingerprint can be computed from the base station identification ("ID") of a base transceiver station 60 serving the mobile device 12 and location data which correlates the base station ID with a physical location. A current location or signal fingerprint of the mobile device 12 is further determinable based on measurements of signals received from one or more of the base transceiver stations 60, 62 via the transceiver 18 and location data providing the physical location of the one or more base transceiver stations 60, 62. The current location or signal fingerprint of the mobile device 12 is alternatively determinable by the mobile device 12 through a GPS fix via signals received by the GPS receiver 22 from GPS satellites 70, predetermined ephemeris and almanac data transmitted by the satellite. Determination of the actual location of the mobile device 12 is not significant in generating the signal fingerprint, and measurements of signals from a plurality of sources implementing a plurality of different protocols are preferably used in generating the signal fingerprint.

As set forth in FIG. 1, the base transceiver stations 60 represent base stations in the process of carrying a telephone call or data session between the mobile devices 12 and usable for determining a current location or generating a signal fingerprint corresponding to a current location of the mobile devices 12. The base transceiver stations 62 represent base stations not currently used in the process of carrying a telephone call or data session between the mobile devices 12, but which are within a reception or transmission range of the mobile devices 12. Base transceiver stations 60 carrying a telephone call or data session for the mobile devices 12 and base transceiver stations 62 within a reception range of the mobile devices 12 can be used for transmitting signals to or receiving signals from the mobile devices 12 for measurement in determining a current location of the first mobile device 12 or generating a signal fingerprint corresponding to a current location of the first mobile device 12.

Suitable non-limiting methods for location determination based on signal measurement include but are not limited to: Angle of Arrival ("AOA"), in which the angles of arrival of signals from two base transceiver stations of known position are determined; Time Difference of Arrival ("TDOA") or Time of Arrival ("TOA"), in which lengths of time it takes to receive signals from three or more base stations of known position are determined; Enhanced Observed Time Difference ("EOTD"), in which lengths of time it takes to receive signals from three or more base stations of known position are determined based on timing data provided via the network; Advanced Forward Link Trilateration ("AFLT"), in which the device position is triangulated based on signal measurements from three or more base stations of known position by determining phase differences of the signals and signal strengths; and signal strength triangulation, in which the device position is triangulated based on signal strength measurements from three or more base stations of known position, wherein in some implementations of signal strength triangulation multipath fingerprinting is incorporated to characterize received signals. Timing Advance ("TA") values provided by a base transceiver station of known position to a mobile device can also provide the basis for calculation of a current location by triangulation or other suitable method.

Signal fingerprint data is preferably determined by the mobile device 12 and transmitted from the mobile device 12 to the coordination server 30 in the form of one or more of: one or more base station IDs, one or more base station locations, angles of arrival of signals from identified base stations 60, 62, lengths of time for signals to travel between identified base stations 60, 62 and the mobile device 12, AFLT measurements corresponding to identified base stations 60, 62, signal strength measurements from identified base stations 60, 62, and TA values corresponding to identified base stations 60, 62. Signal fingerprint data can further include measurements of received signals from other sources implementing protocols including but not limited to Amplitude Modulation ("AM"), Frequency Modulation ("FM"), WiFi™, Bluetooth™, or any protocols typical of LAN wireless access points. Alternatively, a request with accompanying signal and base station ID data can be transmitted from the coordination server 30 to a position determining entity ("PDE") 78, which PDE can provide a signal fingerprint or current location.

The coordination server 30 can alternatively receive from the mobile device 12 an identifier of the mobile device 12 without any signal fingerprint or location indicative data pertaining to the mobile device 12 or an associated base station, along with a locate request. The coordination server 30 can thereafter query a PDE 78, a Gateway Mobile Location Center ("GMLC"), or other suitable resource for a signal fingerprint or location indicative data of the mobile device 12 in response to receiving the locate request. The PDE 78 or other resource may be made available by a telecommunication carrier via the cellular telecommunication network 72 or by an outside service provider. The coordination server 30 preferably communicates with the PDE 78 or other resource via the telecommunication network 72 and/or via the IP gateway 76. Alternatively, the coordination server 30 queries a suitable telecommunication carrier network resource for location data regarding the respective mobile device 12 including but not limited to one or more of base station ID, base station location, AOA measurements, TDOA measurements, TOA measurements, EOTD measurements, AFLT measurements, signal strength measurements, and TA values, and uses such location data to determine a signal fingerprint of the respective mobile device 12.

The mobile devices 12 are preferably configured to locally compute their respective signal fingerprints if signal data from a suitable source is available to the respective mobile device 12. Generation of the signal fingerprint may alternatively be performed by a telecommunication carrier through a location resource residing on the telecommunication network 72, in which case the telecommunication carrier location resource is preferably queried by the mobile device 12 to receive data useful for computing a signal fingerprint. Alternatively, the generation of the signal fingerprint is performed via the coordination server 30 based on signal measurements received from the mobile device 12 via the telecommunication network 72 and/or other data received from a location resource of the telecommunication carrier via the telecommunication network 72.

For a plurality of mobile devices 12, a plurality of tags, and a plurality of location indicative data, the coordination server 30 stores in the signal fingerprint database 36 the data indicative of the particular location of a particular mobile device 12, preferably in the form of the signal fingerprint corresponding to the particular mobile device 12 when the tag was inputted. The coordination server 30 further stores the received tag associated with the signal fingerprint in the tag database 38. Data indicative of one or more of the plurality of tags is transmitted to the one or more others of the plurality of mobile devices 12 in response to current location indicative data received from the one or more others of the plurality of mobile devices 12 corresponding to the location indicative data of one or more of a plurality of particular mobile devices 12 associated with a tag. Alternatively, data indicative of a particular tag can be transmitted to the particular mobile device 12 from which the tag was previously received in response to current location indicative data received from the particular mobile device 12 corresponding to prior location indicative data of the particular mobile devices 12 associated with the tag. The transmitted data indicative of one or more tags can include the one or more tags as received from the particular mobile device 12, an indication of types or numbers of tags corresponding to a mobile device's current signal fingerprint, or data retrieved or generated by the coordination server 30 or other system in response to the tags received from the particular mobile device 12. The data indicative of a tag can further include statistically significant keywords, which keywords can be used to enhance an application by providing location-based contextual information, which application can be executed locally on the mobile device 12 or remotely in a client-server organized system. As such, tag data entered at a particular location via one user of a mobile device 12 can be provided in a predetermined form to another user of another mobile device 12, or the same user of the same mobile device 12 at a later time, when the same or other mobile device 12 is at or within a predetermined distance or time to the particular location.

Alternatively, the coordination server 30 can receive an authorization from a user associated with the first mobile device 12 to provide the tag, as associated with the location indicative data, to an application hosted by a particular application server 73. The coordination server 30 can thereafter transmit tag data as associated with location indicative data to the application server 73 via a network such as the Internet. The application server 73 is configured to interface with the mobile device 12 to provide suitable content or services via an application requiring the tag data for functionality. If authorized by the user of the mobile device 12, the coordination server 30 can further provide the application server 73 an identifier identifying the first mobile device 12 and a user thereof.

A remote application server 73 can further act as an intermediary between the coordination server 30 and a mobile device 12 to which tag data is ultimately transmitted. Referring to FIG. 2, in step 208 of the method 200, data received indicative of a location of a mobile device or devices 12 can be received from a remote system such as the application server 73, and step 210 can be replaced with a step in which data indicative of a tag is transmitted to the remote system, instead of to a mobile device 12 directly, in response to the received location indicative data of such mobile device or devices 12 corresponding to the location indicative data of a particular mobile device 12 from which the tag was initially received in the step 202. The remote system in the form of the application server 73 can thereafter transmit the tag indicative data to the mobile device or devices 12 or otherwise use such data in providing a service to the mobile device or devices 12. In such cases, the application server 73 preferably services a local application executed on the mobile device or devices 12, which local application preferably obtains fingerprint or other location indicative data for transmission to the application server 73, and which application server 73 transmits the location indicative data received by the mobile device 12 to the coordination server 30 in a request for the corresponding tag data. The application server 73 can receive the location indicative data from a mobile device 12 in any suitable form, in the manners described above, and even as manually user-entered location.

In one preferred embodiment of the invention, the tag is received from the particular mobile device 12 as a product identifier manually entered or machine captured via the mobile device 12. The coordination server 30 preferably associates the product identifier with a predetermined product description and transmits the predetermined product description as the data indicative of the tag. The data indicative of the tag transmitted to the one or more other mobile devices 12 preferably includes the predetermined product description. The predetermined product description can include a product specification, advertisement, promotional content, or other data obtained via the product manufacturer or distributor or other entity.

In a preferred embodiment of the invention, data indicative of predetermined ones of the plurality of inputted tags is transmitted by the coordination server 30 to a mobile device 12 in response to the current location indicative data of the mobile device 12 corresponding to the location indicative data of more than one particular mobile device 12 from which a predetermined number of tags of a particular type were received. By receiving a particular tag corresponding to particular location indicative data from a predetermined number of users prior to transmitting the data indicative of the tag to other users, a higher confidence of the particular tag can be achieved. If more than one user enters a tag at a particular location, there is a higher probability that the tag truly corresponds to a particular signal fingerprint, thereby leading to the higher confidence. An indication of a level of confidence can be transmitted along with the data indicative of the tag to a mobile device 12 so a user can gauge how potentially trustable the tag data is.

To further increase tag confidence, tags received by the coordination server 30 from mobile devices 12 are preferably weighted based on quality ratings of the respective users which provide the tags. Users can rate the quality of tag indicative data received via their mobile device 12 and the coordination server 30 can request and receive such rating. The user-provided rating is preferably used as a basis for the coordination server 30 to generate the quality rating of the user or users which provided the tag corresponding to the rated tag indicative data. The coordination server 30, upon receiving a particular tag from a particular user corresponding to a particular location, assigns a point value to the particular tag based on a quality rating of the user. When a substantially identical tag from another user corresponding to an approximately identical location is received, a point value determined based on the quality rating of the other user is added to the point value for the particular tag. The coordination server 30 preferably sends data indicative of the particular tag to other users operating respective mobile devices 12 corresponding to the particular location when the total point value corresponding to the particular tag reaches a predetermined minimum. Alternatively, transmission of tag data to the coordination server 30 can be restricted to users with established administrative or managerial roles. The administrative or managerial roles can be granted by the coordination server 30 to those with certain ownership rights in a particular geographic area. For example, the owner or operator of a department store or shopping center may want that only those with proper authorization such as employees may transmit to the coordination server 30 tags associated with product locations within the department store or shopping center. As indicated above, the location indicative data of the mobile device 12 is preferably a signal fingerprint. The coordination server 30 is configured to compare previously received signal fingerprints of one or more particular mobile devices 12 respectively associated with tags to a received current signal fingerprint of another mobile device or devices 12, or alternatively, even with the same particular mobile device 12. If the current signal fingerprint corresponds to the previously received fingerprints of the one or more particular mobile devices 12, the coordination server transmits data indicative of the tag to the other mobile device or devices 12. The previously received signal fingerprints need not be precisely equal to the current signal fingerprint to trigger transmission of the tag indicative data. Preferably, data indicative of the previously received tag is transmitted to another mobile device in response to the signal fingerprint of the other mobile device corresponding to a predetermined proximity of the location indicative data of the particular mobile device, whereby transmission of the tag is triggered by the current and prior signal fingerprints being within a predetermined degree of similarity. Alternatively, data indicative of the tag is transmitted to another mobile device in response to the signal fingerprint of the other mobile device being within a predetermined edit distance of the previously received signal fingerprint of the particular mobile device. Alternatively, the coordination server 30 defines a fingerprint space and associates the previously received signal fingerprint generated by the particular mobile device with a predetermined multidimensional neighborhood of the fingerprint space defined by data points within one or more predetermined edit distances of the signal fingerprint of the particular mobile device, and the data indicative of the tag is transmitted to another mobile device in response to the signal fingerprint of the other mobile device being within the multidimensional neighborhood of the defined fingerprint space.

Figure 3:
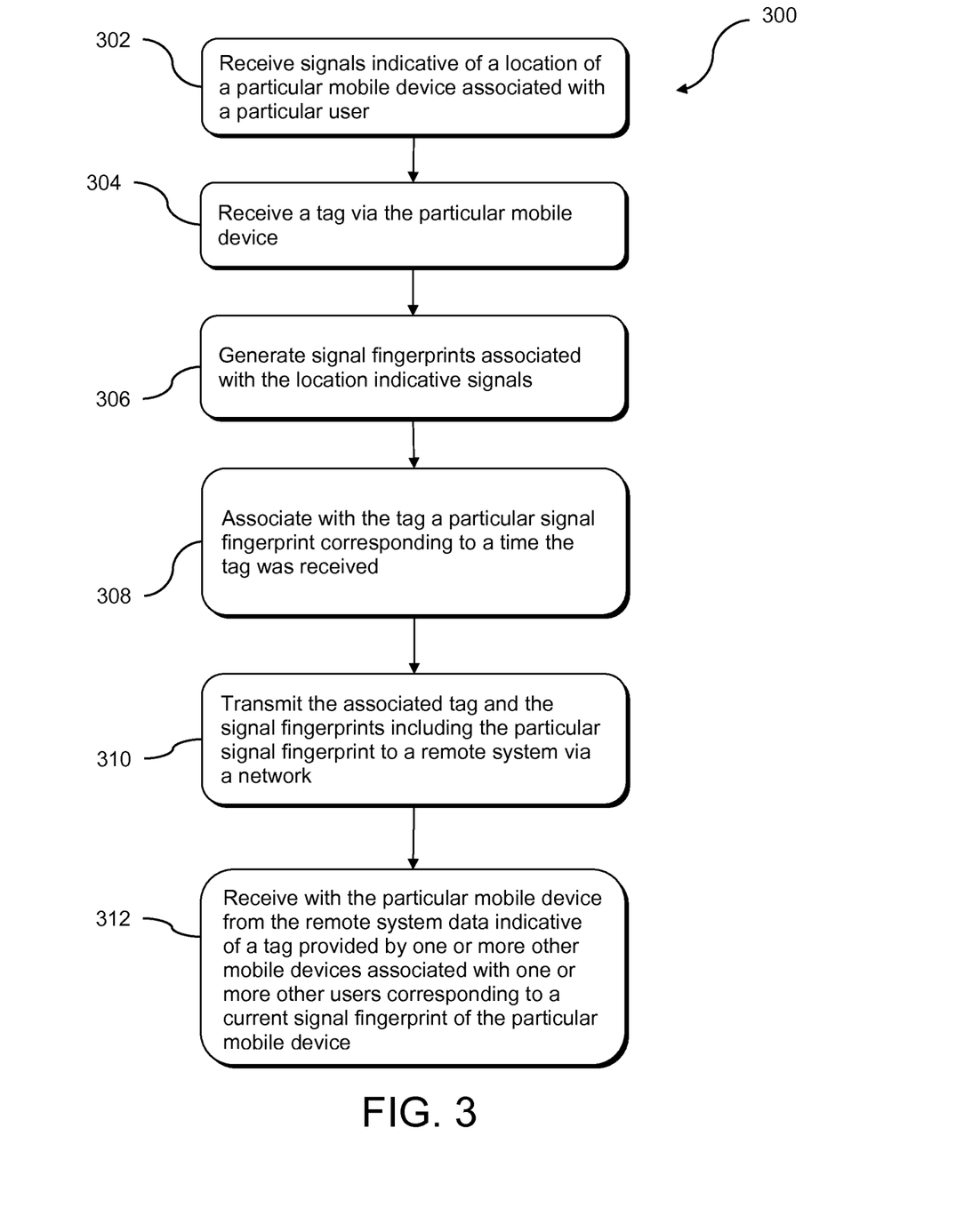
FIG. 3 is a flow chart showing another computer-implemented method for aggregating and disseminating tag data according to a preferred embodiment of the invention.

The data indicative of the particular location of the particular mobile device 12 is preferably a signal fingerprint generated by the particular mobile device 12 pursuant to instructions provided by the instructions module 16. Referring to FIG. 3, a method 300 is preferably performed via a particular mobile device 12 or other suitable device in communication with the coordination server 30 or other suitable system configured to perform the method 200 of FIG. 2. The method 300 includes receiving signals indicative of a location of the particular mobile device 12 associated with a particular user (step 302). A tag is received via the particular mobile device 12 (step 304). Signal fingerprints are generated associated with the location indicative signals (step 306). The received tag is associated with a particular signal fingerprint corresponding to a time the tag was received (step 308). A radio signal scan is preferably performed to receive location indicative signals and a signal fingerprint is preferably generated at substantially the same time a tag is received. The associated tag and the signal fingerprints including the particular signal fingerprint are transmitted to a remote system, preferably the coordination server 30, via a network (step 310). The radio signal scans and signal fingerprint generations are further preferably performed at a predetermined rate or in response to a detected movement without receipt of a tag. Signal fingerprints not associated with tags are transmitted to the coordination server 30 in addition to the particular signal fingerprints associated with tags, permitting the coordination server 30 to compare the signal fingerprints with previously received signal fingerprints associated with tags. Further, the particular mobile device 12 receives from the coordination server 30 data indicative of a tag provided by one or more other mobile devices 12 associated with one or more other users corresponding to a current signal fingerprint of the particular mobile device (step 312). Alternatively, the particular mobile device 12 receives from the coordination server 30 data indicative of a tag provided previously by the particular mobile device 12 corresponding to a current signal fingerprint of the particular mobile device. Steps 302 through 308 correspond to a process through which a mobile device 12 enables a coordination server 30 to implement a training process to build databases 36, 38 of tags paired with respective signal fingerprints, and through which the mobile device 12 provides such coordination server 30 or other suitable system a current signal fingerprint of the particular mobile device to match with its existing contents of its databases 36, 38. Step 312 corresponds to a process through which a mobile device 12 can receive from the coordination server 30 previously received tag data based on a match of its current signal fingerprint with previously received signal fingerprints associated with the previously received tag data.

As indicated above, the tag can be input as a description of a product, an object, a location, a building, a point of interest, or other description associated with a physical entity at a particular location where the mobile device 12 is positioned. In a preferred embodiment, the user can manually select, type or speak a description of an attribute of the described product, object, location, or other entity. For example, within a retail shopping establishment, terms and phrases such as "men's shoes", "toaster", "Walmart™ electronics", or other product or section of the retail shopping establishment can be input via an interface provided by a client application of the mobile device 12. The tag can further be inputted automatically as a sensed machine readable representation of data including a barcode, a radio frequency identification (RFID), or other suitable machine readable material attached to a corresponding product, object, location or other entity. The mobile device 12 is preferably provided with one or more sensors 15 which include one or more of a barcode reader, an RFID reader, and a camera, or alternatively, other suitable sensor for detecting machine readable representation of data. The tag transmitted to the coordination server 30 from the mobile device 12 can include a photograph of a barcode or other machine readable representation of data or a decoded recording of the machine readable representation of data. The transmitted tag can alternatively include a photograph of product packaging or other objects or structures not typically associated with machine readable data, which photograph can be decoded locally at the mobile device 12 or at the coordination server 30 via an image recognition algorithm.

SMS messages including signal fingerprints, or other location indicative data useful for determining the signal fingerprints, and associated tags are preferably sent to the coordination server 30 from a particular mobile device 12 via the SMSC 74. Current signal fingerprints or other location indicative data are preferably generated and sent at a predetermined rate to the coordination server regardless of whether a tag is entered, to permit the coordination server 30 to make the required comparison with previously received location indicative data and transmit relevant tag indicative data to the particular mobile device 12. The use of SMS messaging is preferable in that many cellular telecommunication networks do not currently support the use of a packet data connection simultaneously with a telephone call. Alternatively, the mobile devices 12 can communicate with the coordination server 30 and each other via packet-based TCP/IP networking through the IP gateway 76, via control-plane messaging on the cellular telecommunication network 72, via SS7 signaling, or via other suitable communication.

The coordination server 30 preferably also transmits the tag indicative data to the particular mobile device 12 as an SMS message via the SMSC 74. Two or more SMS messages can be sent to a mobile device if a message content exceeds the character limit of the SMS message format. The SMS message or messages from the coordination server 30 are preferably application-directed with instructions for a client application running via the operating systems 14 of the mobile devices 12. Alternatively, the coordination server 30 can communicate with the mobile devices 12 via TCP/IP through the IP gateway 76 or via other suitable communication protocol.

The mobile devices 12 are preferably configured to interpret SMS message data or other communication from the coordination server 30 via the client application to provide a display or audio output via the respective user interfaces 20. The SMS message or other communication from the coordination server 30 can further provide a link for a mobile device 12 to access corresponding data indicative of a tag on the coordinating server 30 via the IP Gateway 76 or on other remote system via a suitable protocol. In such a manner, excessive data is not required to be transmitted from the coordination server 30 to the mobile device 12.

The coordination server 30 can alternatively be omitted from the operating environment 10, and the mobile devices 12 can communicate with each other as a peer-to-peer organized system permitting exchange of signal fingerprints and tag data. In such case the method 200 can be performed by a mobile device 12, and the remote system of method 300 can comprise the mobile device 12. In such case, mobile devices 12 can communicate with each other via SMS, packet-based TCP/IP networking through the IP gateway 76, via control-plane messaging on the cellular telecommunication network 72, via SS7 signaling, or via other suitable communication.

The method 300 according to the invention is preferably implemented via a client software application on the mobile devices 12. Alternatively, a system for performing the method can be client firmware or hardware enabled. The client application exposes the user interface 20 on the respective mobile device 12 through which the mobile device user can enter a tag corresponding to a product, an object, a location, a building, a point of interest, or other description associated with a physical entity at a particular location where the mobile device 12 is positioned.

Figure 4:
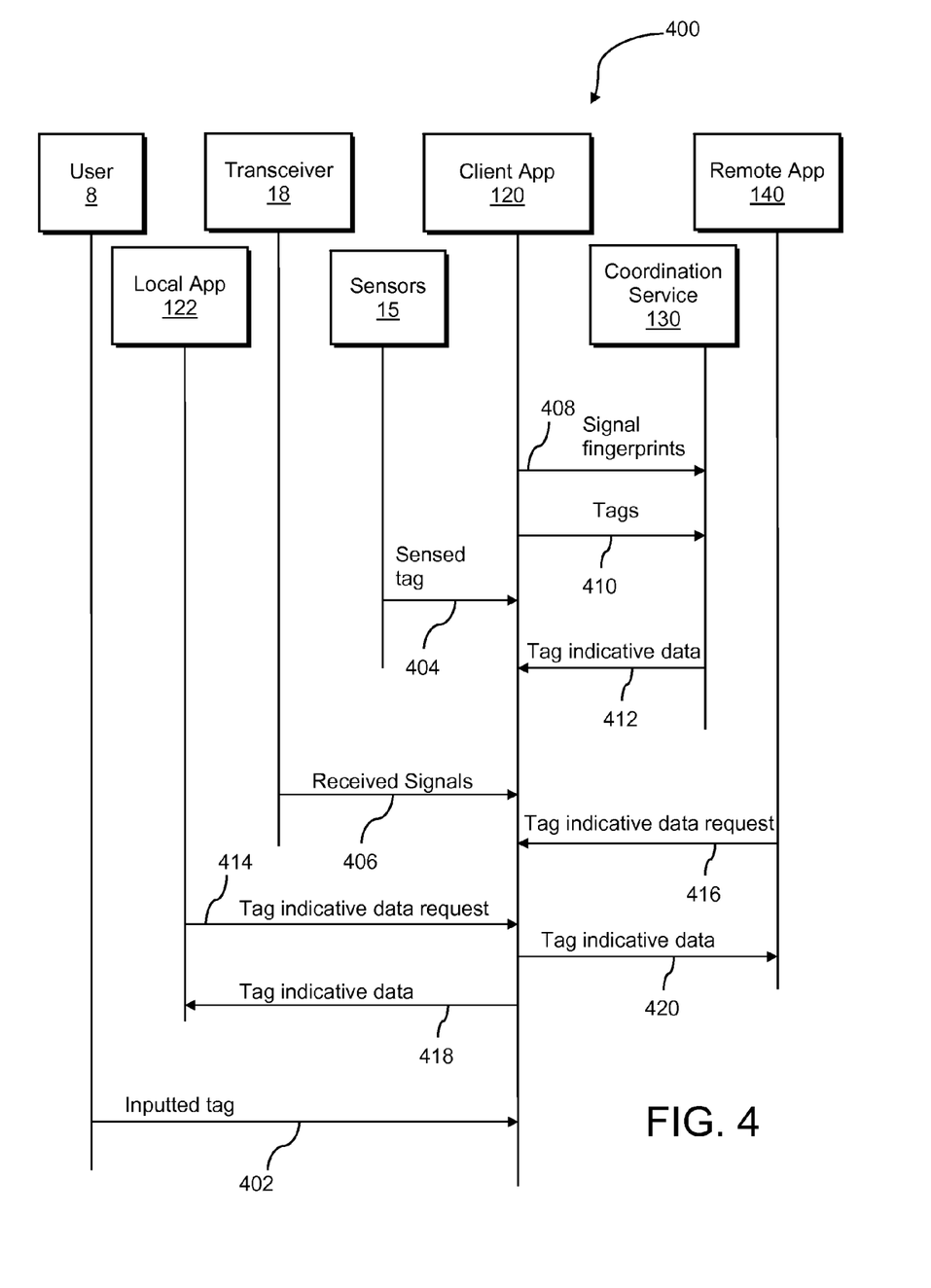
FIG. 4 is an illustration showing a communication flow between entities enabled by the communication systems of FIG. 1 according to a preferred embodiment of the invention.

Referring to FIG. 4, an illustrative communication flow 400 according to a preferred embodiment of the invention is shown between entities enabled by the systems represented in the operating environment 10 of FIG. 1. A user 8 interfaces with a client application 120 executed by the mobile device 12, which mobile device 12 includes the transceiver 18 and the sensors 15. The client application 120 interfaces with a coordination service 130 preferably executed by the coordination server 30. Remote applications 140 are preferably executed by remote application servers 73, and local applications 122 are preferably executed by the mobile device 12, which local and remote applications 122, 140 are preferably user-selected 3$^{rd}$ party applications.

An inputted description of a tag such as a product, an object, a location, a building, a point of interest, or other description associated with a physical entity at a particular location where the mobile device 12 is positioned is communicated to the client application (communication 402). Alternatively, a sensed tag can be communicated to the client application via sensors 15 in the form of a barcode, a radio frequency identification (RFID), or other suitable machine readable representation of data or decoded recording of the machine readable representation of data (communication 404). Measurements of signals received from one or more transmission sources determined via a radio signal scan are communicated to the client application 120 (communication 406). Current signal fingerprints are communicated to the coordination service 130 (communication 408). Tags associated with particular signal fingerprints are communicated to the coordination service 130 to build the signal fingerprint database 36 and tag database 38 of the coordination server 30 as part of a coordination service training process (communication 410). In a positioning process, data indicative of one or more previously received tags is communicated to the client application 120 from the coordination service 130 in response to a current signal fingerprint of the mobile device 12 corresponding to one or more signal fingerprints associated with tags previously received from other mobile devices, or alternatively, previously received from the mobile device 12 to which the data indicative of the tags is communicated (communication 412). It can alternatively be required that the tag indicative data be communicated to the client application 120 (communication 412) in response to a request from a local application (communication 414) or remote application (communication 416) in addition to or instead of responsive to a current signal fingerprint of the mobile device 12 corresponding to one or more signal fingerprints associated with previously received tags. In such cases, the tag indicative data can be forwarded to the local application (communication 418) or remote application (communication 420).

Figure 5:
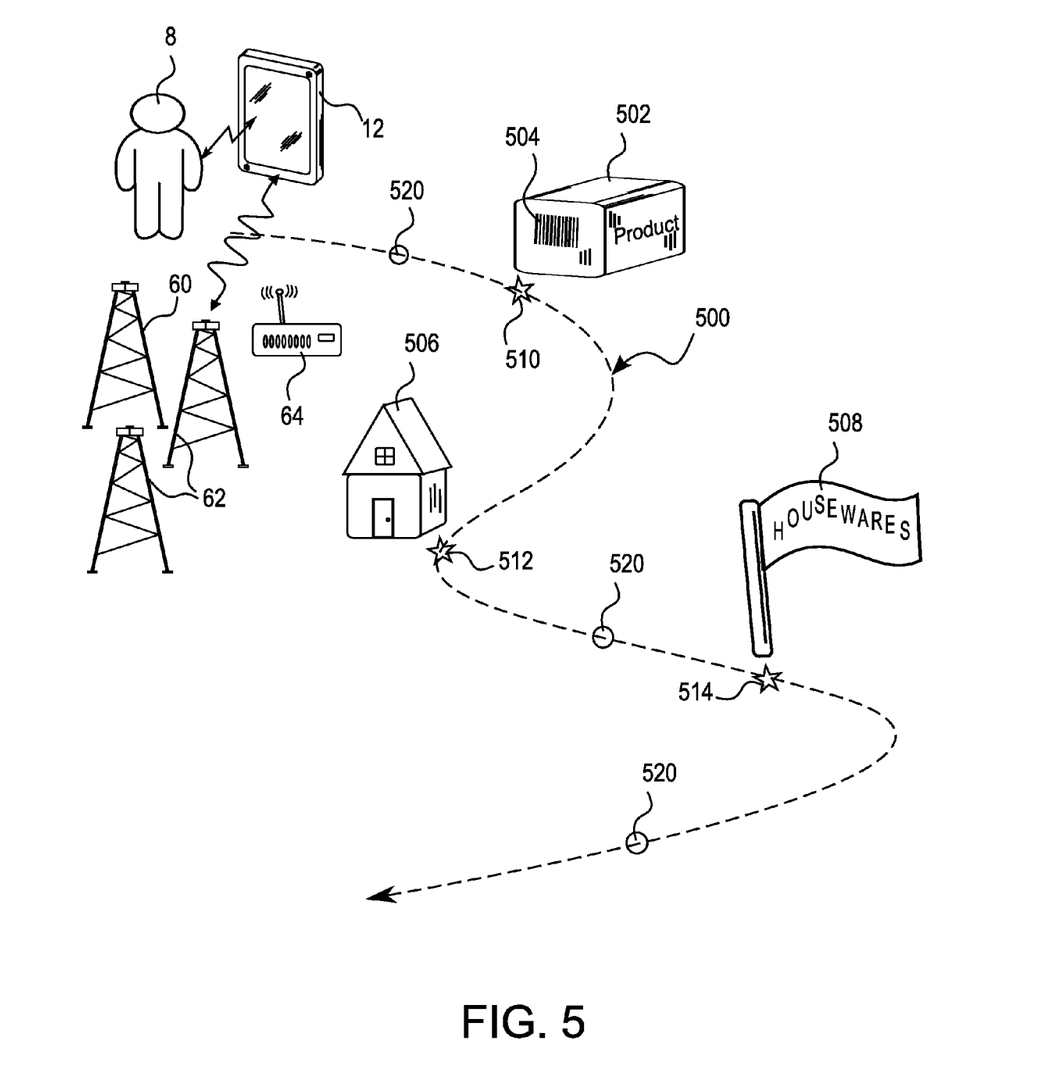
FIG. 5 is an illustration of a route shown traveled by a user of a mobile device enabled pursuant to a preferred embodiment of the invention.

Referring to FIG. 5, an example route 500 is shown traveled by an example user 8 of the mobile device 12 in a process of initiating data communications corresponding to the communication flow 400. At a first location 510 along the route 500 the user 8 happens upon a product 502 at a shopping establishment such as a retail store. The product 502 includes a machine readable representation of data 504 including a barcode, a radio frequency identification (RFID), or other suitable machine readable data which is sensed by the sensor 15 of the mobile device 12 to generate a tag. Alternatively, a product category, a product type, a product brand name, or any suitable description of the product 502 can be inputted manually by the user 8 via the mobile device 12. At a second location 512 a physical landmark 506 is present for which the user 8 inputs with the mobile device 12 as the tag a corresponding description, for example, a building or structure name, type or category. At a third location 514 a section of a shopping establishment 508 is located, such as a store within a mall or a department of a department store or a department of a discount retail outlet, for which the user 8 inputs with the mobile device 12 as the tag a corresponding description, for example the name of the store or the department name as represented by the store.

The mobile device 12 preferably performs a radio signal scan via its transceiver 18 at the first, second and third locations 510, 512, 514 at substantially the same time as entering the respective tags and generates a signal fingerprint based on measured signals from the base stations 60, 62, wireless access points 64 and other available signal sources. To initiate the afore-described coordination service training process, the tags and the respective associated signal fingerprints originating at the first, second and third locations 510, 512, 514 are communicated to the coordination service 130 enabled by the coordination server 30 individually at the time of generation, or together at a later time to conserve computation and bandwidth resources. To initiate the afore-described positioning process, a current real-time signal fingerprint is communicated to the coordination service 130 at predetermined times corresponding to positions 520 along the route 500, which positions 520 do not necessarily correspond to entered tags.

The user 8 might be, for example, a retail store employee who is tasked with walking up and down the aisle of the store where products 502 are located to scan different items with a barcode scanner, camera or other suitable sensor 15 machine readable representation of data 504 on the product 502. The machine scanned data can be supplemented with manually user-inputted description if desired. Scanning a breakfast cereal box may generate a tag associated with the signal fingerprint of a breakfast aisle of a supermarket.

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A method for contributing tag data and receiving promotional content, the method comprising:

using a first mobile device associated with a first user, generating a first tag as a product identifier, wherein the first tag corresponds to at least one of an optical recording, a machine readable representation, a barcode, a radio frequency identification, and a user-inputted description;

using the first mobile device, performing radio signal scans;

using the first mobile device, generating signal fingerprints based on the radio signal scans, wherein at least one of the signal fingerprints corresponds to a particular time the first tag was generated;

using the first mobile device, associating the first tag with a particular signal fingerprint corresponding to the particular time the first tag was generated;
using the first mobile device, transmitting the signal fingerprints to at least one network accessible system;
using the first mobile device, transmitting to the at least one network accessible system the first tag with an indication of the association of the first tag with the particular signal fingerprint; and
receiving with the first mobile device from the at least one network accessible system product promotional content associated with a second tag provided by at least a second mobile device associated with at least a second user, wherein the second tag corresponds to a current signal fingerprint of the first mobile device.

2. The method of claim 1, wherein the promotional content comprises at least one of a product specification and an advertisement.

3. The method of claim 1, wherein the radio signals comprise at least one of Global Positioning System ("GPS"), Amplitude Modulation ("AM"), Frequency Modulation ("FM"), WiFi, and Bluetooth protocol signals.

4. The method of claim 1, wherein performing the radio signal scan comprises receiving data generated via at least one of GPS; Assisted-GPS, Observed Time Difference, Time Of Arrival, Time Difference of Arrival, Angle of Arrival, multipath fingerprinting, Timing Advance, Enhanced Forward Link Triangulation, Time Difference of Arrival & Received Signal Strength, Time Difference of Arrival & Angle of Arrival, Assisted Forward Link Triangulation & Assisted GPS, and Enhanced Observed time Difference & Assisted GPS.

5. The method of claim 1, further comprising generating the first tag as at least one of an optical recording and a photograph of a machine readable representation of data captured via the first mobile device.

6. The method of claim 1, further comprising generating the first tag as a description of a product.

7. The method of claim 1, further comprising generating the first tag as a description of a section of a shopping establishment.

8. The method of claim 1, further comprising receiving from the network accessible system with the first mobile device a plurality of product promotional content associated with a plurality of tags respectively corresponding to a plurality of signal fingerprints of a plurality of other mobile devices which respectively correspond to particular ones of the signal fingerprints generated by the first mobile device.

9. The method of claim 1, further comprising receiving with the first mobile device from the at least one network accessible system product promotional content associated with the first tag in response to a current signal fingerprint of the first mobile device corresponding to the particular signal fingerprint of the first mobile device, wherein the particular signal fingerprint is generated at a prior time.

10. Non-transitory computer-readable media tangibly embodying a program of instructions operable to cause a particular mobile device to perform a process comprising:
generating a tag as a product identifier, wherein the tag corresponds to at least one of an optical recording, a machine readable representation, a barcode, a radio frequency identification, and a user-inputted description;
performing radio signal scans;
generating signal fingerprints based on the radio signal scans, wherein at least one of the signal fingerprints corresponds to a particular time the tag was generated;
associating the tag with a particular signal fingerprint corresponding to the particular time the tag was generated;
transmitting the signal fingerprints to at least one network accessible system;
transmitting to the network accessible system the tag with an indication of the association of the tag with the particular signal fingerprint; and
receiving from the at least one network accessible system product promotional content associated with another tag provided by at least one other mobile device, wherein the other tag corresponds to a current signal fingerprint of the particular mobile device.

11. The computer-readable media of claim 10, wherein the process further comprises transmitting a request to the at least one network accessible system for the product promotional content.

12. The computer-readable media of claim 10, wherein the process further comprises receiving the user input of the tag as at least one of a recording and a photograph of a machine readable representation of data captured via the particular mobile device.

13. The computer-readable media of claim 10, wherein the process further comprises providing an interface for input of a tag by a user and receiving user input of the tag.

14. The computer-readable media of claim 10, wherein the promotional content comprises at least one of a product specification and an advertisement.

15. A mobile device comprising memory tangibly embodying a program of instructions operable to cause the mobile device to perform a process comprising:
generating a tag as a product identifier, wherein the tag corresponds to at least one of an optical recording, a machine readable representation, a barcode, a radio frequency identification, and a user-inputted description;
performing radio signal scans;
generating signal fingerprints based on the radio signal scans, wherein at least one of the signal fingerprints corresponds to a particular time the tag was generated;
associating the tag with a particular signal fingerprint corresponding to the particular time the tag was generated;
transmitting the signal fingerprints to at least one network accessible system;
transmitting to the network accessible system the tag with an indication of the association of the tag with the particular signal fingerprint; and
receiving from the at least one network accessible system product promotional content associated with another tag provided by at least one other device, wherein the other tag corresponds to a current signal fingerprint of the mobile device.

16. A method performed using a mobile device for contributing tag data and receiving promotional content comprising:
generating a tag as a product identifier, wherein the tag corresponds to at least one of an optical recording, a machine readable representation, a barcode, a radio frequency identification, and a user-inputted description;
performing radio signal scans;
generating signal fingerprints based on the radio signal scans, wherein at least one of the signal fingerprints corresponds to a particular time the tag was generated;
associating the tag with a particular signal fingerprint corresponding to the particular time the tag was generated;
transmitting the signal fingerprints to at least one network accessible system;
transmitting to the at least one network accessible system the tag with an indication of the association of the tag with the particular signal fingerprint; and receiving from the at least one network accessible system product promotional content associated with the tag in response to a current signal fingerprint of the mobile device corresponding to the particular signal fingerprint of the mobile device generated at a prior time.

* * * * *